United States Patent
Agranat

(10) Patent No.: US 10,670,704 B1
(45) Date of Patent: Jun. 2, 2020

(54) METHOD AND APPARATUS FOR DETECTION OF ULTRASONIC ECHOLOCATION CALLS

(71) Applicant: WILDLIFE ACOUSTICS, INC., Maynard, MA (US)

(72) Inventor: Ian Agranat, Concord, MA (US)

(73) Assignee: WILDLIFE ACOUSTICS, INC., Maynard, MA (US)

( * ) Notice: Subject to any disclaimer, the term of this patent is extended or adjusted under 35 U.S.C. 154(b) by 0 days.

(21) Appl. No.: 16/422,055

(22) Filed: May 24, 2019

(51) Int. Cl.
*G01S 7/53* (2006.01)
(52) U.S. Cl.
CPC ...................... *G01S 7/53* (2013.01)
(58) Field of Classification Search
CPC ...... G01S 15/107; G01S 15/102; G01S 15/06; G01S 15/10; G01S 15/02; G01S 15/00

USPC .......... 367/87, 93, 135, 149, 178, 584, 645; 73/584, 645

See application file for complete search history.

(56) References Cited

U.S. PATENT DOCUMENTS

| | | | |
|---|---|---|---|
| 5,277,065 A * | 1/1994 | Leszczynski | G01F 23/2962 367/903 |
| 9,377,530 B2 * | 6/2016 | Kish | A61H 3/061 |
| 2010/0278012 A1* | 11/2010 | Tremper | G01S 7/52003 367/102 |
| 2013/0336093 A1* | 12/2013 | Suvanto | G01S 15/06 367/99 |

* cited by examiner

*Primary Examiner* — Emily C Terrell
(74) *Attorney, Agent, or Firm* — Lando & Anastasi, LLP

(57) ABSTRACT

Methods and apparatus for recording and analyzing echolocation calls using zero crossing and/or digital sampling (full spectrum analysis) techniques, and for optimizing trigger thresholds used to activate recording in response to detection of an echolocation call.

13 Claims, 3 Drawing Sheets

METHOD AND APPARATUS FOR DETECTION OF ULTRASONIC ECHOLOCATION CALLS

BACKGROUND

The ultrasonic echolocation calls of bats are recorded by a variety of bat detector devices using full spectrum analysis and/or zero-crossing detection technology. Full spectrum devices are conventional digital audio recorders that record using high sample rates, e.g. typically between 192 kilohertz (kHz) and 500 kHz to resolve ultrasonic signals typically between 96 kHz and 250 kHz. Zero-crossing devices filter out unwanted low frequency signal content and then record the timings between a constant number of successive zero crossings from which the dominant frequency of narrow-band ultrasonic signals as they change through time can be derived.

Rather than record continuously, bat detector devices typically wait for a triggering event such as the detection of an ultrasonic signal, and then record until either the signal is no longer detected or for a fixed maximum duration, typically up to several seconds. Triggering can be performed in either the analog or digital domains. Some devices analyze each triggered signal to determine if the signal is likely to contain the echolocation calls of bats or might be falsely triggered due to ultrasonic energy in rain, wind, and other conditions. If a signal is unlikely to contain echolocation calls, the device may opt to not save the recording, or delete the recording after it is saved, in order to save space and make post-processing more efficient. The process of selectively not saving or deleting unwanted recordings is called "scrubbing."

SUMMARY OF INVENTION

Aspects and embodiments provide methods and apparatus implementing a technique for efficient and economical triggering and scrubbing in bat detector devices.

According to one embodiment, an echolocation call detection system comprises an ultrasonic microphone configured to produce an analog signal, a first digital to analog converter configured to provide a first output signal representing a first trigger threshold, and a first comparator configured to receive the analog signal at a first input and to receive the first output signal from the first digital to analog converter at a second input, the first comparator being configured to compare the first output signal and the analog signal and to produce a zero-crossing signal representative of zero crossings of the analog signal relative to the first trigger threshold set by the first digital to analog converter. The echolocation call detection system further comprises a second digital to analog converter configured to provide a second output signal representing a test trigger threshold, a second comparator configured to receive and compare the analog signal and the second output signal from the second digital to analog converter and to provide a test signal representative of zero crossings of the analog signal relative to the test threshold set by the second digital to analog converter, and a microprocessor coupled to the second comparator, to the first digital to analog converter, and to the second digital to analog converter, the microprocessor being configured to receive the test signal output from the second comparator and to control the second digital to analog converter to optimize the second output signal to a most sensitive trigger threshold above sampled background noise, the microprocessor being further configured to periodically control the first digital to analog converter to adjust the first output signal from the first digital to analog converter to match the second output signal from the second digital to analog converter.

In one example the echolocation call detection system further comprises a multiplexor connected between the first digital to analog converter and the second comparator, the multiplexor configured to selectively provide to the second comparator one of the first output signal from the first digital to analog converter and the analog signal. In another example, the second comparator is configured, in response to receiving the first output signal from the multiplexor to compare the first and second output signals and to provide a comparison signal indicating whether the first trigger threshold is higher or lower than the test trigger threshold.

In one example, the echolocation call detection system further comprises a flag coupled to the second comparator and to the microprocessor, the flag being configured to receive the test signal from the second comparator and to indicate an edge detected in the test signal from the second comparator.

In another example, the echolocation call detection system further comprises a high pass filter coupled to the ultrasonic microphone and configured to filter the analog signal. In one example, echolocation call detection system further comprises an amplifier coupled to an output of the high pass filter and configured to amplify the analog signal. The echolocation call detection system may further comprise a divider coupled to an output of the first comparator and configured to divide the zero-crossing signal to produce a divided zero-crossing signal.

In one example, the microprocessor is further configured to receive a first signal derived from the zero-crossing signal.

In one example, the echolocation call detection system further comprises a timer counter, a memory, and a first digital memory access controller coupled to the timer counter, the memory, and the first comparator, the first digital memory access controller configured to, in response to receiving the zero-crossing signal, copy contents of the timer counter into a first buffer resident in the memory to store a sequence of zero crossing timings in the memory, the sequence of zero-crossing timings being representative of a sequence of echolocation calls. The echolocation call detection system may further comprise an analog to digital converter configured to receive the analog signal and to produce corresponding series of digitized samples, and a second digital memory access controller coupled to the analog to digital converter and to the memory, the second digital memory access controller being configured to store the series of digitized samples in a second buffer resident in the memory, the digitized samples being representative of the sequence of echolocation calls. In one example, the microprocessor is coupled to the memory and to the first digital memory access controller.

In another example, the echolocation call detection system further comprises a memory, an analog to digital converter configured to receive the analog signal and to produce corresponding series of digitized samples, and a digital memory access controller coupled to the analog to digital converter and to the memory, the digital memory access controller being configured to store the series of digitized samples in a buffer resident in the memory, the digitized samples being representative of the sequence of echolocation calls. In one example, the microprocessor is coupled to the memory and to the digital memory access controller.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
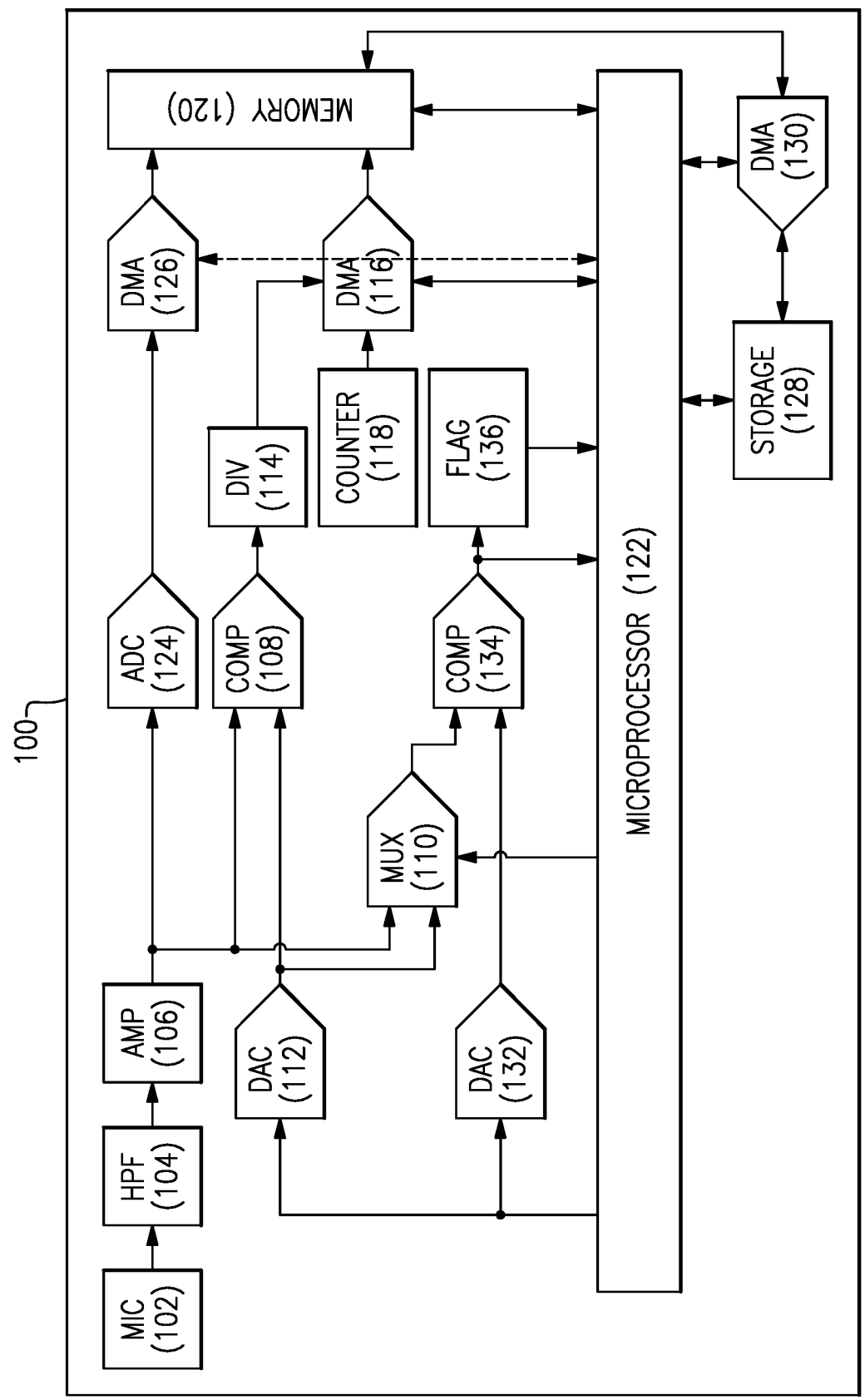
FIG. 1 is functional block diagram of one example of an echolocation call detector and analysis system according to aspects of the present invention.

Aspects and embodiments are directed to methods and apparatus for recording and analyzing echolocation calls using zero crossing and/or digital sampling (full spectrum analysis) techniques. The ultrasonic echolocation calls produced by bats and other animals are typically narrowband frequency modulated signals that may be described as whistles or sweeps, and tend to include relatively short bursts of sound with periods of quiet in between. Accordingly, as discussed above, to save storage space, most echolocation call detector devices do not record continuously, but instead begin recording upon detection of a trigger event that should correspond to detection of an echolocation call.

Triggering can be performed in either the analog or digital domains. In the analog domain, a signal may be filtered by one or more high-pass or band-pass filters, and triggering occurs if the signal energy in a given frequency band exceeds a specified fixed threshold. In the digital domain, band pass filtering may be performed by a series of Fast Fourier Transforms (FFTs) and the per-band thresholds can be automatically adapted to ambient background levels. The echolocation pulses of interest may be detected by analyzing zero crossings or FFTs for continuous narrowband signals matching certain frequency, time and smoothness characteristics.

One disadvantage of analog triggers is that the triggering threshold is difficult to optimize given changing environmental conditions. If a threshold is set too low, the detector can be prone to continuous triggering if the ambient noise levels become greater due to wind, rain, or other noise sources, for example. If a threshold is set too high, the detector is less sensitive and may not trigger on fainter echolocation calls. Certain zero crossing detectors may adaptively adjust the optimum analog trigger threshold at the beginning of a recording period, but these devices cannot adjust the threshold while the recorder is recording due to there being only one trigger level source. Accordingly, the optimum trigger level cannot be determined without compromising recordings being made at the same time, as discussed further below. One disadvantage of digital triggers is that the continuous computation of sequential Fast Fourier Transforms is expensive with respect to power consumption and the cost of a processor used that can keep up with the real-time computational demand.

Aspects and embodiments provide a continuously adaptable trigger and a technique for echolocation call detection for scrubbing that can be implemented with lower cost, lower power microprocessors. For example, some highly integrated processors such as the STM32L476xx from ST Microelectronics include operational amplifiers, analog comparators, digital to analog converters (DACs), analog to digital converters (ADCs), direct memory access (DMA) controllers, and SD memory storage card interfaces within a single low cost and low power package. Certain embodiments leverage the configuration and capabilities of such integrated processors to provide an efficient and economical approach to triggering and scrubbing in echolocation call detector devices.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single one, more than one, and all of the described terms.

Referring to FIG. 1, there is illustrated a block diagram of one example of an echolocation recording and/or analysis system according to one embodiment. The system 100 includes an ultrasonic microphone 102 configured to detect echolocation calls. The ultrasonic microphone and associated electronics convert the acoustic pick-up from the microphone into an analog electrical signal representative of background noise and any detected echolocation pulses. The analog signal output of the ultrasonic microphone 102 optionally may be high-pass filtered by a high-pass filter 104 to reduce unwanted low frequency noise and amplified by an amplifier 106 to a suitable voltage. The output of the amplifier 106 is connected to one input of a first comparator (108) and optionally also to a multiplexor 110, as discussed further below. A first digital to analog converter (DAC) 112 provides an output that sets a trigger threshold against which the analog signal from the amplifier 106 can be compared to detect the echolocation calls. Accordingly, the first comparator 108 has a second input coupled to the first DAC 112, and produces a square wave signal (the "zero-crossing signal") representing zero crossings of the filtered and amplified analog input signal relative to the threshold set by the first DAC 112. The zero-crossing signal is then optionally divided by a digital divider 114 to produce a divided zero crossing signal. The divided zero crossing signal triggers a first DMA controller 116 to copy the contents of a timer counter 118 into a buffer resident in a memory 120. In certain examples the timer counter 118 may count at a rate of 1 Megahertz (MHz) or faster and has sufficient bits to avoid wrapping during the duration of a recording, typically 24 or 32 bits, for example. The result is a series of zero crossing timings stored in the memory 120 that can be analyzed by a microprocessor 122 to determine if an echolocation call, such as bat calls, for example, are present.

In addition, according to certain embodiments, the system 100 optionally further includes an analog to digital converter 124 and second DMA controller 126. In combination and simultaneously with the above-discussed zero crossing detection process, the filtered and amplified analog signal output from the amplifier 106 may be digitized with the analog to digital converter 124 and used to trigger the second DMA controller 126 to store digitized samples in another buffer resident in the memory 120. This is so-called full spectrum data. According to certain examples, if the analysis performed by the microprocessor 122 on the zero crossing signal indicates that echolocation calls of interest are likely present, the zero crossing data and/or the optional full spectrum data can be written to a storage medium 128, for example by using a third DMA controller 130. Those skilled in the art will appreciate that in certain examples the DMA controllers 116, 126, and/or 130 can be replaced by read and write operations performed directly by the microprocessor 122; however, at least in certain examples, the DMA controllers 116, 126, 130 may provide a more efficient solution.

According to certain embodiments, the system 100 is configured to determine the optimum threshold set by the first DAC 112 and adapt the threshold continuously through time to maximize sensitivity of the system 100 while minimizing false triggers. To accomplish this, the system 100 further includes a second DAC 132, a second comparator 134, and a "flag" 136. The second DAC 132 is used to test possible threshold levels against the actual signal output from the amplifier 106 using the second comparator 134. The flag 136 indicates if an edge is detected at the second comparator 134. The flag 136 may be implemented in a variety of different ways. For example, the flag 136 may be a flip-flop or similar device that may produce an output indicator that is either "true" (e.g., a digital 1), indicating that an edge has been detected, or "false" (e.g., a digital 0), indicating that no edge has been detected. In other examples, the flag 136 may be implemented using a digital counter. For example, detecting an edge (i.e., a zero crossing) at the second comparator may cause a digital counter (corresponding to the flag 136) to increment or decrement a count value, with changes in the count value indicating the zero crossings being detected. As discussed above, in certain examples, system 100 includes the multiplexor 110. Accordingly, in certain examples this optional analog signal multiplexor 110 can be configured such that the amplified signal output from the amplifier 106 can be compared to the output from the second DAC 132 using the second comparator 134. Once an optimal threshold is determined, the first DAC 112 can be configured to match the second DAC 132. Since the two DAC units 112, 132 may not be precisely calibrated to each other, in certain examples, the multiplexor 110 can be configured to compare the outputs of the first DAC 112 and the second DAC 132 using the second comparator 134 such that the first DAC 112 can be adjusted up or down to precisely match the more optimized threshold set by the second DAC 132. Inclusion of the second DAC 132 provides a second trigger level source, separate from the zero-crossing signal itself, thereby enabling the threshold level to be adjusted while the system 100 is actively recording an echolocation call. Accordingly, an optimal threshold level may be determined without comprising signal recordings being made at the same time.

The nature of bat echolocation pulses allows for an optimal triggering level to be found even during periods of bat activity. For example, referring to FIG. 2, which illustrates an example of a portion of the analog signal 200 output from the microphone 102 or amplifier 106, a typical bat echolocation pulse 202 has a duration of between 1-50 milliseconds with inter-pulse intervals of silence/background noise 204 typically greater than tens of milliseconds. According to certain examples, the microprocessor 122 can be programed with a process that looks for the lowest possible threshold above the background noise, indicated at arrow 206, of a short time period, e.g., 5 milliseconds, occurring over a longer time period, e.g., 250 milliseconds, and can detect the background levels found in between echolocation pulses 202.

Figure 3:
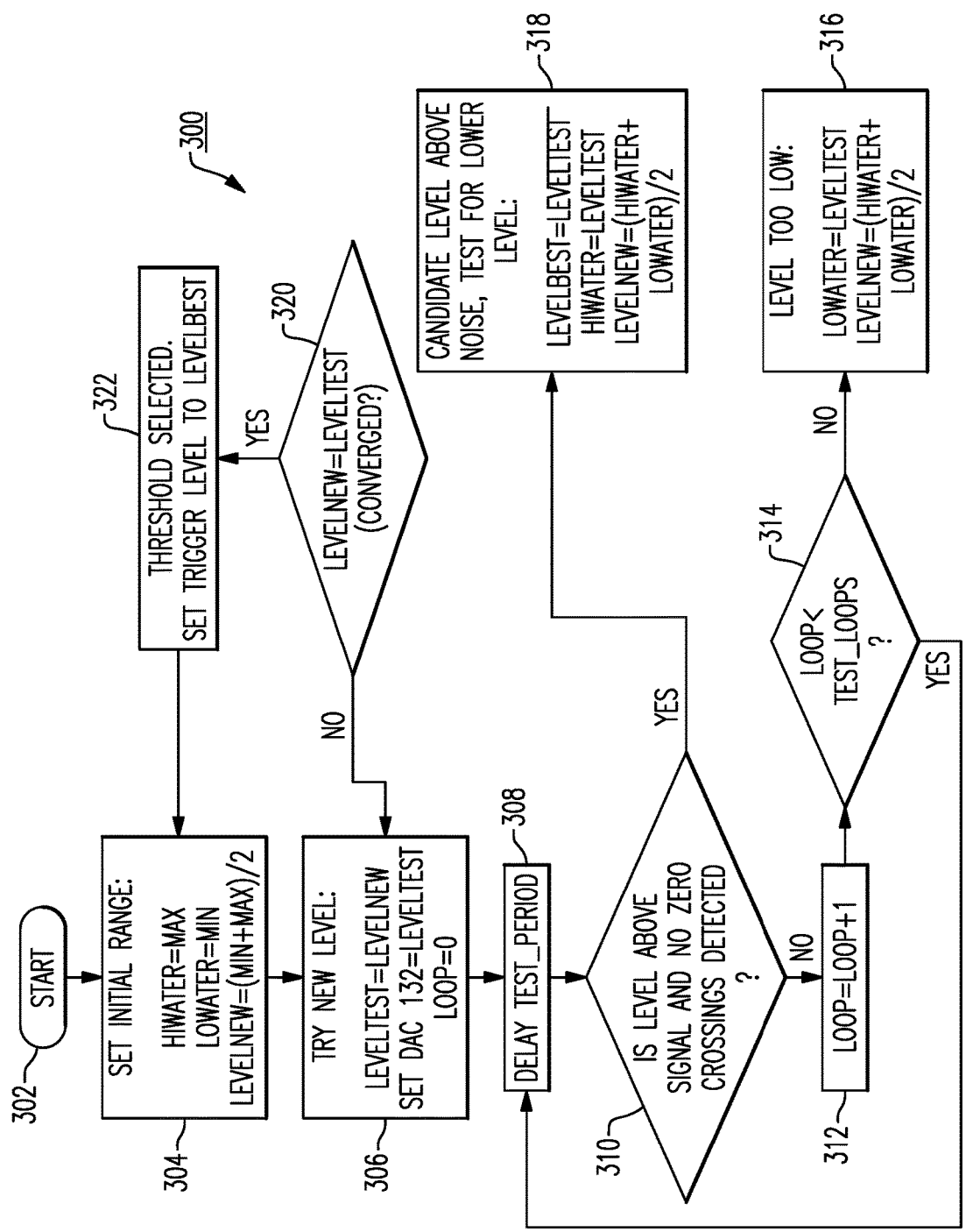
FIG. 3 is a process flow diagram of one example of a process for dynamically adjusting a record triggering threshold of an example of the system of FIG. 1, according to aspects of the present invention.

FIG. 3 is a flow diagram of one example of a trigger threshold optimization process 300 according to certain embodiments. The following corresponding pseudocode describes an example of the process 300, demonstrating how the microprocessor 122 may continuously adjust the optimum threshold of the first DAC 112 for triggering the system 100 to begin recording. As used herein, the optimum trigger level is the lowest threshold for which a short period (on the order of 5 milliseconds, for example) representative of background noise is found within a larger sampling period (on the order of 250 milliseconds, for example) which may or may not also include ultrasonic signals.

In the below example of pseudocode, the following parameters are defined:
  DAC_MAX_VALUE=4095
  DAC_MIN_VALUE=0
  TEST_PERIOD=0.005
  TEST_LOOPS=50

The parameter DAC_MAX_VALUE defines the maximum digital value of the first DAC 112, which in this example is a 12-bit DAC. Similarly, the parameter DAC_MIN_VALUE defines the minimum digital value of the DAC. Those skilled in the art will appreciate that values other than 4095 and 0, respectively, may be used in other examples. The parameter TEST_PERIOD defines the number of seconds between iterations of the loop, and the parameter TEST_LOOPS defines the number of iterations of the loop to be performed at the rate specified by the parameter TEST_PERIOD. Again, it will be appreciated that in other examples, values other than 0.005 and 50, respectively, may be used. Those skilled in the art will further appreciate that some parameters or variables may be set permanently or by an operator and may or may not be updated each time, or some times, the process 200 is executed on the microprocessor 122.

Example Pseudocode Procedure

```
1.  While (true)
2.    {   Int level_hiwater = DAC_MAX_VALUE
```

-continued

```
3.          Int level_lowater = DAC_MIN_VALUE;
4.          Int level_new = (DAC_MAX_VALUE +
                DAC_MIN_VALUE)/2;
5.          Int level_test;
6.          Int loop;
7.          Do
8.          {
9.             level_ test = level_new;
10.            DAC_132 = level_test;
11.            For (loop = 0; loop < TEST_LOOPS; loop++)
12.            {
13.               FLAG18 = false;
14.               Sleep(TEST_PERIOD);
15.               If (COMP_134 == 0 && FLAG18 == false)
16.               {
17.                  level_hiwater = level_test;
18.                  level_best = level_test;
19.                  break
20.               }
21.            }
22.            If (loop >= TEST_LOOPS)
23.            {
24.               level_lowater = level_test;
25.            }
26.            level_new = (level_hiwater + level_lowater)/2;
27.         } Until level_new == level_test;
28.         DAC_112 = level_best;
29.      }
```

Referring to FIG. 3, and to the above pseudocode example, the process 300 begins at step 302. At step 304, outer limits are set for the range of values for the threshold of the second DAC 132, as shown in lines 2-4 of the pseudocode. As discussed above, according to certain examples, the process 300 attempts to find the lowest trigger threshold 206 above the noise in the signal 200. Accordingly, the "hiwater" and "lowater" values are used to define the range of possible threshold values. In step 306, a test value for the threshold value set by the second DAC 132, "leveltest," is selected, and the process begins the "Do" loop (lines 7-27 of the pseudocode) to evaluate this test threshold level. In one example, the current test value of the threshold, is set at the midpoint between the hiwater and lowater values, and the process quickly divides the range of possible trigger (threshold) levels by a factor of two at each iteration until the optimum level is determined. As discussed further below, if the evaluation process shows that the current test value is too low, the lowater limit can be adjusted up to the current test level (step 316), and if it is shown that the current test level is too high, the hiwater limit can be adjusted down to the current test level (step 318). Thus, in one example, in each iteration of the "Do" loop, the process bisects the possible values and approaches a solution in order of log 2N of the possible DAC values. Thus, for a 12-bit DAC, for example, this process may take on the order of twelve iterations of the "Do" loop.

The "For" loop (lines 11-21) in the pseudocode evaluates whether there is an interval of duration TEST_PERIOD above the noise floor, in other words, where no zero crossings are detected and the flag 136=false, and where the test threshold value is above the analog signal value (the output from the comparator 134 is zero). Thus, at step 308 the process waits for a time period TEST_PERIOD, and then at decision block 310 determines whether the test threshold level is above the analog signal 200 and there are no zero crossings detected. If the determination is step 310 is "NO," the loop counter is incremented at step 312, and the test threshold value is tested again, up until the number of loop iterations reaches the number specified by the parameter TEST_LOOPS (decision block 314). If during this loop, it is found that the threshold is above the signal and no zero crossings are detected during the interval TEST_PERIOD, this indicates that the current test threshold is a candidate for background noise. Accordingly, the process 300 may test for a lower threshold level, making the system 100 more sensitive by moving the trigger threshold closer to the noise. Accordingly, the process 300 may break out of the loop (at line 19) and the "hiwater" limit can be set to the current test level in step 318. Alternatively, if the loop counter value is reached (determination at decision block 314 is "YES"), this indicates that the current test threshold level is too low because it is either below the signal or within the noise (e.g., there was no period of at least 5 milliseconds (TEST_PERIOD), for example, with no zero crossings detected during the longer time frame defined by TEST_LOOPS). In this case, the "lowater" mark is updated (step 316), and the next time the process is executed, the starting trial threshold value may be made higher.

Thus, the "For" loop, corresponding to steps 308-318, provides a number of chances/iterations (100 with the example values given above) to find a TEST_PERIOD that is quiet above the noise floor. This is because there may be echolocation pulses present (e.g., corresponding to bat activity, for example) during the testing time of the particular threshold value. For example, and referring again to FIG. 2, if an echolocation pulse 202 is present during the test cycle, the signal 200 may be above the threshold value, and no zero crossings may be observed. Accordingly, the process 300 waits for a longer time period (re-runs the loop discussed above). If no zero crossings are observed for at least the short interval defined by the parameter TEST_PERIOD over the longer interval defined by TEST_LOOPS, it can be concluded that the test threshold level is above the background noise 204. On the other hand, if zero crossings are always observed over the longer interval defined by TEST_LOOPS, it can be concluded that the test threshold is too low, or is too close to the noise floor. In this case, corresponding to lines 22-25 of the pseudocode and step 316, the test threshold can be raised (decreasing the sensitivity of the system 100) and the new level evaluated.

Figure 2:
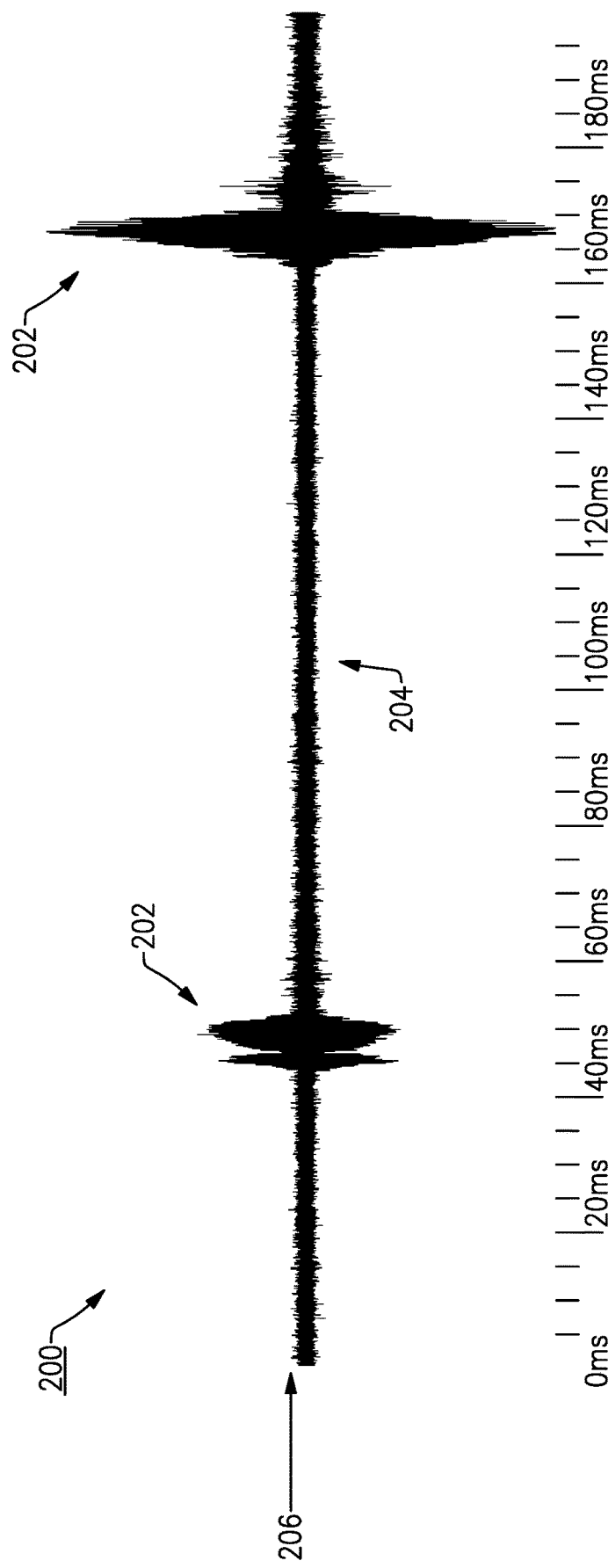
FIG. 2 is an illustration of an example of a portion of an analog signal showing typical bat echolocation pulses with inter-pulse intervals of silence/background noise.

As shown in FIG. 2, the ideal trigger threshold 206 is just above the background noise 204. If the threshold is too low, it may fall within the noise 204, and therefore needs to be raised as discussed above and indicated at step 316. If the threshold is above the background noise 204 and no zero crossings are detected during the testing period, it may be a good trigger threshold, but the process 300 may continue to test lower threshold values to try to optimize the level and the sensitivity of the system 100 (decision block 320). The value "levelbest" is the best threshold level tested so far by the process 300, and may represent the optimum threshold level at a given time. Accordingly, is step 322, this threshold level may be selected, and therefore, the "live" threshold level, namely the trigger threshold used by the first DAC 112, can be updated. The process may continue to repeat to continuously update the trigger threshold for the first DAC 112 to adjust to changing environmental conditions, for example. In certain examples, the threshold value for the second DAC 132 may be set to "levelbest" and the threshold for the first DAC 112 may be adjusted to match using the second comparator 134.

The above-discussed example of the pseudocode process, with the example values give above, uses the second DAC 132 and the second comparator 134 to try different threshold levels at a rate of 200 per second and narrow in to the lowest possible level that does not generate transitions during each $\frac{1}{200}$ second period. The best value measured after a maximum of 250 milliseconds times 12 is then used to update the trigger level threshold of the first DAC 112, thus optimizing the trigger level threshold periodically within, at most, three seconds. In other examples, the time periods can be updated to a faster or slower rate, as will be readily appreciated by those skilled in the art, given the benefit of this disclosure. Accordingly, various embodiments of the process 200 and pseudocode procedures described above are not limited to the specific time periods or values given in the examples.

Furthermore, in certain embodiments, the multiplexor 110 may be used to directly compare the outputs from the first DAC 112 and the second DAC 134 such that the threshold level of the first DAC 112 can be adjusted upward or downward until the second comparator 134 indicates a transition. This technique can precisely match the actual threshold used by the first DAC 112 with the experimental threshold determined using the above-discussed process, given that any two DACs may not be calibrated relative to each other. Alternatively, without a multiplexor or without using the multiplexor 110, the threshold level of the first DAC 112 may be simply be set to the optimized value determined from the process 200.

As discussed above, in the example of the system 100 shown in FIG. 1, the system 100 is configured to perform both a zero-crossing analysis and includes components to implement full spectrum (digital sampling) analysis of the sounds collected by the ultrasonic microphone 102. In other examples, the analog to digital converter 124 and the second 126 may be eliminated or not used, in which case the system 100 can be configured as a zero-crossing detector only. In either case (zero crossing only detector or combination zero crossing and full spectrum detector), the above-discussed process and techniques for dynamically adjusting the triggering threshold for activating recording by the system 100 can be implemented as described above.

Thus, aspects and embodiments provide a method and echolocation call detection system in which analog signals are collected by an ultrasonic microphone and digitized for analysis by a first DAC, and a second DAC along with a comparator are used to optimize the output of the comparator to the most sensitive trigger threshold above sampled background noise, the trigger threshold being used to activate a recording mode of the system. The first DAC can be adjusted to match the output of the second DAC periodically. In certain examples, the system is a zero-crossing detector that includes components to store zero crossing timings in memory representative of a sequence of echolocation calls which can then be stored as a file on an associated storage medium. In other examples, the system can further include components to store a digital samples in the memory representative of a sequence of echolocation calls which can then be stored as another file on the associated storage medium, and which can be processed to perform a full spectrum analysis of the echolocation calls.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An echolocation call detection system comprising:
   an ultrasonic microphone configured to produce an analog signal;
   a first digital to analog converter configured to provide a first output signal representing a first trigger threshold;
   a first comparator configured to receive the analog signal at a first input and to receive the first output signal from the first digital to analog converter at a second input, the first comparator being configured to compare the first output signal and the analog signal and to produce a zero-crossing signal representative of zero crossings of the analog signal relative to the first trigger threshold set by the first digital to analog converter;
   a second digital to analog converter configured to provide a second output signal representing a test trigger threshold;
   a second comparator configured to receive and compare the analog signal and the second output signal from the second digital to analog converter and to provide a test signal representative of zero crossings of the analog signal relative to the test threshold set by the second digital to analog converter; and
   a microprocessor coupled to the second comparator, to the first digital to analog converter, and to the second digital to analog converter, the microprocessor being configured to receive the test signal output from the second comparator and to control the second digital to analog converter to optimize the second output signal to a most sensitive trigger threshold above sampled background noise, the microprocessor being further configured to periodically control the first digital to analog converter to adjust the first output signal from the first digital to analog converter to match the second output signal from the second digital to analog converter.

2. The echolocation call detection system of claim 1 further comprising:
   a multiplexor connected between the first digital to analog converter and the second comparator, the multiplexor configured to selectively provide to the second comparator one of the first output signal from the first digital to analog converter and the analog signal.

3. The echolocation call detection system of claim 2 wherein the second comparator is configured, in response to receiving the first output signal from the multiplexor to compare the first and second output signals and to provide a comparison signal indicating whether the first trigger threshold is higher or lower than the test trigger threshold.

4. The echolocation call detection system of claim 1 further comprising:
   a flag coupled to the second comparator and to the microprocessor, the flag being configured to receive the test signal from the second comparator and to indicate an edge detected in the test signal from the second comparator.

5. The echolocation call detection system of claim 1 further comprising:
   a high pass filter coupled to the ultrasonic microphone and configured to filter the analog signal.

6. The echolocation call detection system of claim 5 further comprising:
   an amplifier coupled to an output of the high pass filter and configured to amplify the analog signal.

7. The echolocation call detection system of claim 6 further comprising:
a divider coupled to an output of the first comparator and configured to divide the zero-crossing signal to produce a divided zero-crossing signal.

8. The echolocation call detection system of claim 1 wherein the microprocessor is further configured to receive a first signal derived from the zero-crossing signal.

9. The echolocation call detection system of claim 1 further comprising:
a timer counter;
a memory; and
a first digital memory access controller coupled to the timer counter, the memory, and the first comparator, the first digital memory access controller configured to, in response to receiving the zero-crossing signal, copy contents of the timer counter into a first buffer resident in the memory to store a sequence of zero crossing timings in the memory, the sequence of zero-crossing timings being representative of a sequence of echolocation calls.

10. The echolocation call detection system of claim 9 further comprising:
an analog to digital converter configured to receive the analog signal and to produce corresponding series of digitized samples; and
a second digital memory access controller coupled to the analog to digital converter and to the memory, the second digital memory access controller being configured to store the series of digitized samples in a second buffer resident in the memory, the digitized samples being representative of the sequence of echolocation calls.

11. The echolocation call detection system of claim 9 wherein the microprocessor is coupled to the memory and to the first digital memory access controller.

12. The echolocation call detection system of claim 1 further comprising:
a memory;
an analog to digital converter configured to receive the analog signal and to produce corresponding series of digitized samples; and
a digital memory access controller coupled to the analog to digital converter and to the memory, the digital memory access controller being configured to store the series of digitized samples in a buffer resident in the memory, the digitized samples being representative of the sequence of echolocation calls.

13. The echolocation call detection system of claim 12 wherein the microprocessor is coupled to the memory and to the digital memory access controller.

\* \* \* \* \*